United States Patent [19]
Arpe

[11] 3,888,884
[45] June 10, 1975

[54] PROCESS FOR THE PREPARATION OF PIVALOLACTONE

[75] Inventor: Hans-Jürgen Arpe, Fischbach/Taunus, Germany

[73] Assignee: Hoechst Aktiengesellschaft, Frankfurt am Main, Germany

[22] Filed: June 6, 1972

[21] Appl. No.: 260,277

[30] Foreign Application Priority Data
June 8, 1971 Germany............................ 2128406

[52] U.S. Cl. ............................................ 260/343.9
[51] Int. Cl................................................. C07d 3/00
[58] Field of Search................................. 260/343.9

[56] References Cited
UNITED STATES PATENTS
3,491,120  1/1970  Nakahara et al. ............... 260/343.9
3,492,315  1/1970  Nakahara......................... 260/343.9
3,511,855  5/1970  Merger et al. ................... 260/343.9

Primary Examiner—Donald G. Daus
Assistant Examiner—Anne Marie T. Tighe
Attorney, Agent, or Firm—Curtis, Morris & Safford

[57] ABSTRACT

Process for the preparation of pivalolactone by thermally splitting off acetic acid from $\beta$-acetoxy-pivalic acid in the presence of alkali metal and/or alkaline earth metal compounds applied to a special carrier material, the pore volume of which contains more than 50% of macropores having a pore diameter of from 100 to 1000 A.

9 Claims, No Drawings

PROCESS FOR THE PREPARATION OF PIVALOLACTONE

The present invention relates to a process for the preparation of pivalolactone.

The preparation of pivalolactone, i.e. $\alpha,\alpha$-dimethyl-$\beta$-propiolactone by thermal degradation of $\beta$-acyloxy-pivalic acids, for example $\beta$-formyloxy- or $\beta$-acetyloxy-pivalic acid, at a temperature in the range of from 150° to 300°C, in the presence of oxides of elements of the third and fourth main group, of phosphates of metals of the third maingroup, or of silicates of metals of the first and third main group of the Mendeleev Periodic System, is already known. In the reaction of for example, $\beta$-acetoxy-pivalic acid in the presence of $Al_2O_3$ or $Al_2O_3/ZrO_2$, conversion rates of 43 and 67% respectively and selective rates of pivalolactone of from 47 to 64.5% are obtained; i.e., the yields are in the range of from 20 to 39%.

Furthermore, a process for the preparation of pivalolactone is known in which thermolysis of $\beta$-acyloxy-pivalic acid is carried out in the presence of an oxide of one of the following metals: copper, silver, magnesium, calcium, zinc, barium, cadmium, aluminium, cerium, thallium, silicium, tin, lead, antimony, bismuth, chrome, manganese, iron, cobalt or nickel, or in the presence of an acetate of one of the following metals: lithium, sodium, potassium, magnesium, zinc, cadmium, cerium or lead, at a temperature in the range of from 150° to 500°C and under a pressure of from 1 to 760 mm Hg. The oxides or acetates are applied to carriers such as pumice, silica gel or kieselguhr, or they are formed together with them. At very differing rates of conversion of the preferably used $\beta$-acetoxy-pivalic acid, the most favorable yields of pivalolactone (from 42 to 70%) are obtained when alkali metal acetates or Celite are used. Of all alkali metal acetates examined, sodium acetate gives the highest lactone yield of 78.3%, at a conversion rate of 84% of $\beta$-acetoxy-pivalic acid.

Furthermore, the preparation of pivalolactone from $\beta$-acetoxy-pivalic acid by thermal degradation in the presence of a catalyst consisting of a carbonate or hydroxide of one of the following metals: lithium, sodium, potassium, rubidium, caesium, calcium, strontium or barium, or of a hydrogen carbonate of one of the following metals: sodium, potassium, rubidium or caesium, is also described. The catalytic material may be applied to carriers such as pumice, Celite, silica gel or diatomaceous earth. Sodium hydrogen carbonate on Celite powder proved to be the most active catalyst in this series. Activity and selectivity of the catalysts cannot be compared, since the indicated values are not clearly distinguished.

Pivalolactone may also be formed by thermal degradation of a $\beta$-acyloxy-pivalic acid in the presence of a carboxylate of the metals of the first to eighth group of the Mendeleev Periodic System, with or without carrier. As carriers, pumice, silica gel, diatomaceous earth, aluminium oxide, silicium dioxide or active charcoal may be employed. Conversion rates of $\beta$-acetoxy-pivalic acid are not indicated; the values given make not clear whether they mean yields or selectivity rates. Therefore, a comparison is not possible also in this case.

All these cited processes, on account of the incomplete conversion of acyloxy-pivalic acid, require recycling of the non converted starting material. Moreover, on account of the non quantitative yield of pivalolactone, i.e., on account of the formation of by-products, they are insufficient with respect to their industrial utility and profitability.

A process has now been found for the preparation of $\alpha,\alpha$-dimethyl-$\beta$-propiolactone (pivalolactone) by thermally splitting off acetic acid from $\beta$-acetoxy-pivalic acid in the presence of a carrier catalyst containing metal compounds, wherein as metal compounds alkali metal or alkaline earth metal compounds are used which are applied on a carrier material the pore volume of which contains more than 50% of macropores having a pore diameter of from 100 to 1000 A.

The important function of the carrier in this thermolysis reaction is a surprising fact, since according to the known processes as indicated above, carriers are only used in the general sense of the definition, i.e. for assimilation and better distribution of the active material, without special preference given to a distinct type of carrier.

It was furthermore surprising to find a physical parameter which could be coordinated with the selectivity-increasing action of the carrier, so that it is possible to choose the most appropriate carriers from any possible number of them.

For a characterization of the structure of the pores, the integral pore volume distribution as a function of the pore diameter is physically determined by the methods of the mercury pressure porosimetry and of desorption. From the integral pore volume distribution it can be seen to what extent pores of a determined diameter contribute to the total pore volume.

The characteristic feature of those carriers which are especially appropriate according to the present invention is a very high amount of more than 50%, preferably up to 90%, of the total pore volume, which is in the form of pores having a diameter in the range of from 100 to 1000 A. In this range, the virtual "efficient pores" are contained, in which pores, on the catalytically active material, the elimination of the acetic acid and thus the formation of the pivalolactone occurs. The acetoxy-pivalic acid which is to be thermolyzed can rapidly diffuse into these pores and thus be quantitatively converted. The thermally labile pivalolactone which is formed can diffuse out of the pores just as easily and thus elude secondary reactions such as thermolysis forming isobutylene and $CO_2$ or polymerization forming polypivalolactone. Therefore, the results are a very high yield of pivalolactone and a long life of the catalyst.

Pores having a diameter below 100 A, especially those in the range of the molecular size of acetoxy-pivalic acid or pivalolactone, cause disadvantageous secondary reactions on account of their hindering a proper diffusion.

Pores having a diameter above 1000 A, which occur for example in sintered materials having a small surface of a few square meters per gram, nearly do not contribute at all to the catalytic activity.

In the following Table, three characteristic carriers are listed in order to illustrate the indicated facts:

Kinds of pore volume distribution in carriers

| Carrier | Pore volume ml/g | Percentage in total pore volume | | | Surface m²/g | Aptitude to preparation of pivalolactone |
|---|---|---|---|---|---|---|
| | | <100 A φ | 100–100 A φ | >1000 A φ | | |
| silicic acid | 1.10 | 8.5 | 89.9 | 1.7 | 120 | excellent |
| silica gel | 0.49 | 55.0 | 34.3 | 10.7 | 300 | fair |
| α-aluminium oxide | 0.25 | — | — | 100 | 0.9 | poor |

An especially preferred carrier is silicic acid, the pore volume of which, at a rate of from 70 to 90%, consists of pores having a pore diameter of from 200 to 600 A.

The catalytically active material in accordance with the present invention with which one of the cited suitable carriers is impregnated, consists of alkali metal or alkaline earth metal compounds. Suitable compounds are those of lithium, sodium, potassium, caesium, rubidium, beryllium, magnesium, calcium, strontium or barium.

Suitable compounds are the acetates or such compounds which, under the reaction conditions, can be converted into the acetates in the presence of the acetic acid eliminated from β-acetoxy-pivalic acid, for example the oxides, hydroxides, hydrogen carbonates, carbonates, or salts of organic carboxylic acids having up to 4 carbon atoms, for example sodium formiate, magnesium propionate, potassium butyrate or strontium isobutyrate.

In principle, also salts of higher carboxylic acids which may also be substituted, as well as salts of the acetoxy-pivalic acid itself may be employed. However, lithium acetate, magnesium acetate or calcium acetate are especially recommended.

The concentration of the alkali metal and/or alkaline earth metal compound on the carrier may be widely varied in a range of from 1 to 20% by weight, but advantageously it is from 3 to 10% by weight.

The thermolysis in accordance with the invention is carried out at a temperature of from 150° to 400°C. Especially good results are obtained in a temperature range of from 250° to 350°C.

The conversion of β-acetoxy-pivalic acid as described is advantageously carried out under reduced pressure in a range of from 0.1 to 400 mm Hg, preferably from 5 to 50 mm Hg. On the other hand, the acetic acid may also be eliminated under normal pressure or a slight overpressure.

The β-acetoxy-pivalic acid, either in molten state or in a solvent as for example acetic acid, may be contacted with a catalyst after having been vaporized. The vapors may be diluted additionally with inert gases, for example nitrogen or carbon dioxide. These vapors are passed over the catalyst which may be either fixed in a solid bed or fluidized by the vapors. Subsequently, the condensable portions are collected in cooling traps and the condensate is subjected to a fractional distillation, thus separating first the acetic acid from the privalolactone and subsequently the latter from possible residues.

A special advantage of the process of the invention is the complete conversion of the starting material, i.e. β-acetoxy-pivalic acid, into pivalolactone, thereby attaining high selectivity rates. Thus, lengthy separation processes requiring great expenditure in apparatuses in order to recycle the starting material are avoided. Moreover, the high selectivity rate of pivalolactone ensures a long life of the catalyst, since the formation of by-products (for example polymer deposits) is prevented.

Pivalolactone is a valuable monomer for the preparation of linear high molecular weight polyesters which can be used as thermoplastics or as fiber material. Furthermore, on account of its reactivity, it is suitable for reaction with numerous compounds, for example alcohols, phenols, or amines, in order to prepare interesting intermediate products.

The following examples illustrate the invention. The quantities indicated there are defined as follows:

The conversion rate of acetoxy-pivalic acid is the percental molar amount of acid converted, relative to the amount of acid employed.

The selectivity rate of pivalolactone is the percental molar amount of pivalolactone obtained, relative to the acetoxy-pivalic acid converted.

The yield of pivalolactone is the percental molar amount of lactone obtained, relative to the acetoxy-pivalic acid employed.

EXAMPLE 1

From a heated dropping funnel, 121 millimoles of molten β-acetoxy-pivalic acid per hour are dosed into a vertically mounted glass reactor having a length of 320 mm and a diameter of 21 mm, which is heated at 300°C and in which 100 ml of catalyst are present. This catalyst contains silicic acid (grain diameter from 0.5 to 1.5 mm) as carrier material, which has a pore volume of 1.10 cm³/g, a surface of 120 m²/g and pores having a diameter in the range of from < 100 A to > 1000 A. These pores are distributed in the total pore volume as follows:

| Pore diameter | Percentage |
|---|---|
| < 100 A | 8.5% |
| 100 to 1000 A | 89.9% |
| (therein contained from 200 to 600 A | 81.2%) |
| >1000 A | 1.7% |

The carrier is impregnated with 5.78% by weight of magnesium acetate. The reactor is heated at a constant temperature by means of two electric stoves; the upper third of the glass tube serving as vaporizer and the lower two thirds of it as reaction tube proper. The temperature in the interior of the reactor is measured by means of a slide thermo-couple.

The reaction products are condensed in steps within two cooling traps; the first of it being cooled with icewater and the second one with liquid air. The pressure in the reactor is from 10 to 20 mm Hg.

After a preliminary running period of 2 hours in order to set constant operation data, the real catalyst test is run over a longer period. With the aid of an exterior standard set, pivalolactone, acetic acid and possibly non-converted β-acetoxy-pivalic acid are analyzed by means of gas-chromatography. In the united condensates of a 4 hour test, no β-acetoxy-pivalic acid can be detected, which means that the conversion is quantitative.

480 Millimoles of pivalolactone and 482 millimoles of acetic acid are detected, which corresponds to a yield of 99.2 mole % of pivalolactone and 99.6 mole % of acetic acid. On account of the 100% conversion of β-acetoxy-pivalic acid, the selectivity rate is the same as the yield.

The space-time-yield is 180 g of pivalolactone per catalyst and hour. Over some hundred hours of test time, the catalyst does not show any decrease of activity and selectivity.

Pivalolactone and acetic acid can be separated without any loss of lactone by distillation under reduced pressure using a column. The pivalolactone is obtained in a purity degree of more than 99.9%. Its boiling point is at 54°C/15 mm Hg.

EXAMPLES 2 to 9

Using the same test equipment as in Example 1, 121 millimoles of β-acetoxy-pivalic acid (APA) per each hour are converted, at a temperature of 300°C and under a pressure of from 10 to 30 mm Hg, into pivalolactone and acetic acid, using 100 ml of catalyst in each case.

The catalysts consist of a carrier of different composition, having differing amounts of macropores of a 100 to 1000 A diameter in the total pore volume. The carriers are impregnated with such an amount of magnesium acetate that optimum selectivity rates and yields of pivalolactone are obtained.

In the following Table, the results are listed. The Examples 5 to 9 are comparative examples using other carriers than those in accordance with the present invention. The catalysts of these comparative examples rather rapidly take a black color on account of carbon deposits, and they show a decrease of activity and selectivity.

| Example No. | Magnesium acetate % by weight | Carrier | Percentage of total pore volume attributable to pores with a diameter between 100 and 1000 A | Conversion APA mole % | Pivalolactone mole % selectivity rate | mole % yield |
|---|---|---|---|---|---|---|
| 2 | 6.30 | $SiO_2$ | 81.0 | 99.2 | 99.1 | 98.3 |
| 3 | 5.50 | $SiO_2$ (sintered) | 82.9 | 97.8 | 96.2 | 94.1 |
| 4 | 6.69 | $SiO_2$ | 71.2 | 97.0 | 88.0 | 85.4 |
| 5 | 5.50 | Silica gel | 34.3 | 96.3 | 55.0 | 53.0 |
| 6 | 4.60 | $TiO_2$ | 26.7 | 94.6 | 54.0 | 51.1 |
| 7 | 6.69 | $Al_2O_3 \cdot SiO_2$ | 24.9 | 99.3 | 56.9 | 56.5 |
| 8 | 3.82 | $\alpha\text{-}Al_2O_3$ | 0 | 99.0 | 40.2 | 39.8 |
| 9 | 4.16 | $Al_2O_3 \cdot SiO_2$ | 0 | 95.3 | 39.1 | 37.3 |

EXAMPLES 10 to 17

From a heated storage vessel, 465 millimoles per hour of molten β-acetoxy-pivalic acid are dosed into an electrically heated prevaporizer (length 300 mm, diameter 23 mm) by means of a rotameter and from there, together with a nitrogen current (0.5 l/hour), introduced into a metal reactor. This reactor is horizontally mounted, its length is 400 mm and its diameter 40 mm. It contains 500 ml of catalyst having a grain size of from 0.5 to 1.5 mm in the diameter. The reactor temperature is maintained at a constant 300°C by means of a salt melt. The pressure in the apparatus is from 10 to 30 mm Hg. The reaction products are condensed in cooling traps as described in Example 1, and analyzed by gas-chromatography.

In the following Table the results are listed which are obtained on catalysts containing a $SiO_2$ carrier having a 71.2% pore volume amount which consists of macropores of a 100 to 1000 A diameter. The carrier is impregnated with 30 millimoles each of the acetates of the cited alkali or alkaline earth metals.

| Example No. | Metal acetate | Conversion APA mole % | Pivalolactone Selectivity rate mole % | Yield mole % |
|---|---|---|---|---|
| 10 | Li | 97.1 | 87.6 | 85.1 |
| 11 | Na | 97.4 | 77.0 | 75.0 |
| 12 | K | 94.2 | 30.4 | 28.6 |
| 13 | Cs | 95.3 | 27.5 | 26.2 |
| 14 | Mg | 97.0 | 88.0 | 85.4 |
| 15 | Ca | 98.1 | 86.7 | 85.1 |
| 16 | Sr | 98.3 | 83.4 | 82.0 |
| 17 | Ba | 97.4 | 56.9 | 55.4 |

EXAMPLE 18

In analogy to the test procedure of Example 1, 150 millimoles per hour of molten β-acetoxy-pivalic acid are passed over a catalyst which contains 15 millimoles of sodium carbonate on a $SiO_2$ carrier, the macropores of which, at a diameter of from 100 to 1000 A, cover 82.9% of the total pore volume.

At 300°C and under a pressure of from 10 to 20 mm Hg, the yield of pivalolactone is 79.2 mole % and the conversion rate of β-acetoxy-pivalic acid 96.0 mole %.

EXAMPLE 19

In analogy to the test procedure of Example 1, 121 millimoles of molten β-acetoxy-pivalic acid together with 50 millimoles of acetic acid are passed per hour, at 315°C and under a pressure of from 20 to 40 mm Hg, over a catalyst containing 15 millimoles of potassium hydroxide and 15 millimoles of strontium hydroxide on a $SiO_2$ carrier, the macropores of which, at a diameter of from 100 to 1000 A, cover 82.9% of the total pore volume.

The yield of pivalolactone is 92.7 mole % at a conversion rate of 94.2 mole % of β-acetoxy-pivalic acid.

EXAMPLE 20

In analogy to the test procedure of Example 1, 121 millimoles of molten β-acetoxy-pivalic acid together with 50 millimoles of acetic acid are passed per hour, at a temperature of 300°C and under a pressure of from 10 to 20 mm Hg, over a catalyst containing 30 millimoles of magnesium isobutyrate on a SiO$_2$ carrier, the macropores of which, at a diameter of from 100 to 1000 A, cover 82.9% of the total pore volume.

The yield of pivalolactone increases slowly over several hours and attains a constant value of 90.4 mole % at a conversion rate of 97.0 mole % of β-acetoxy-pivalic acid. The selectivity rate of pivalolactone is 93.2 mole %.

What is claimed is:

1. In a process for the preparation of α,α-dimethyl-β-propiolactone (pivalolactone) by thermally splitting off acetic acid from β-acetoxy-pivalic acid in the presence of a carrier catalyst having alkali metal and/or alkaline earth metal compounds selected from the group consisting of an oxide, a hydroxide, hydrogen-carbonate, carbonate or salt of a carboxylic acid having up to 4 carbon atoms of lithium, sodium, potassium, rubidium, caesium, magnesium, calcium, strontium or barium, the improvement which consists essentially of using a silicic acid carrier in which more than 50% of the pore volume is attributable to pores having a pore diameter of from 100 to 1000 A.

2. A process as claimed in claim 1, wherein 70 to 90% of the pore volume of said silicic acid carrier is attributable to pores having a pore diameter of from 200 to 600 A.

3. A process as claimed in claim 1, wherein lithium acetate, magnesium acetate or calcium acetate is used.

4. A process as claimed in claim 1, wherein the concentration of the alkali metal and/or alkaline earth metal compound on the carrier is from 1 to 20% by weight.

5. A process as claimed in claim 1, wherein the concentration of the alkali metal and/or alkaline earth metal compound on the carrier is from 3 to 10% by weight.

6. A process as claimed in claim 1, wherein the reaction on the catalyst is carried out at a temperature of from 150° to 400°C.

7. A process as claimed in claim 1, wherein the reaction on the catalyst is carried out at a temperature of from 250° to 350°C.

8. A process as claimed in claim 1, wherein the reaction is carried out under a pressure of from 0.1 to 400 mm Hg.

9. A process as claimed in claim 1, wherein the reaction is carried out under a pressure of from 5 to 50 mm Hg.

* * * * *